(12) United States Patent
Lawrey

(10) Patent No.: US 6,624,281 B1
(45) Date of Patent: Sep. 23, 2003

(54) POLYURETHANE/UREAS USEFUL FOR THE PRODUCTION OF SPANDEX AND A PROCESS FOR THEIR PRODUCTION

(75) Inventor: Bruce D. Lawrey, Moon Township, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/158,616

(22) Filed: May 30, 2002

(51) Int. Cl.[7] .............................................. C08G 18/10
(52) U.S. Cl. ............................. 528/61; 528/64; 528/65; 528/76; 528/906
(58) Field of Search ........................... 528/61, 65, 906, 528/64, 76

(56) References Cited

U.S. PATENT DOCUMENTS

| | | | |
|---|---|---|---|
| 3,180,854 A | 4/1965 | Schneider et al. | 260/77.5 |
| 3,384,623 A | 5/1968 | Inoue et al. | 260/75 |
| 3,393,243 A | 7/1968 | Cuscurida | 260/615 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,483,167 A | 12/1969 | Sommer et al. | 260/75 |
| 3,829,505 A | 8/1974 | Herold | 260/611 B |
| 3,941,849 A | 3/1976 | Herold | 260/607 A |
| 4,282,387 A | 8/1981 | Olstowski et al. | 568/618 |
| 4,687,851 A | 8/1987 | Laughner | 544/398 |
| 5,010,117 A | 4/1991 | Herrington et al. | 521/159 |
| 5,010,187 A | 4/1991 | Heuvelsland | 536/120 |
| 5,114,619 A | 5/1992 | Heuvelsland | 252/182.27 |
| 5,340,902 A | 8/1994 | Smith et al. | 528/61 |
| 5,691,441 A | 11/1997 | Seneker et al. | 528/61 |
| 5,998,574 A | * 12/1999 | Fishback et al. | |

FOREIGN PATENT DOCUMENTS

JP 2001098420 * 4/2001

OTHER PUBLICATIONS

Polyurethane Handbook, (Gunther Oertel, Ed., Carl Hanser Verlag Pub., Munich, (month unavailable) 1985, Reactants, p. 578, Polyurethane Elastomeric Fibers.

* cited by examiner

Primary Examiner—Rachel Gorr
(74) Attorney, Agent, or Firm—Joseph C. Gil; Lyndanne M. Whalen

(57) ABSTRACT

Segmented polyurethane/ureas useful for the production of spandex are produced by chain extending, in the presence of a solvent, an isocyanate-terminated prepolymer prepared by reacting a stoichiometric excess of an isocyanate with an isocyanate-reactive component which includes: (1) from about 5 to about 30 equivalent percent of a polyoxypropylene diol having a molecular weight of at least 1500 Da and an unsaturation level less than or equal to 0.03 meq/g; (2) from about 20 to about 60 equivalent percent of a polytetramethylene ether glycol having a molecular weight less than 1000 Da; and (3) from about 25 to about 65 equivalent percent of a polytetramethylene ether glycol having a molecular weight greater than or equal to 1000 Da.

17 Claims, No Drawings

POLYURETHANE/UREAS USEFUL FOR THE PRODUCTION OF SPANDEX AND A PROCESS FOR THEIR PRODUCTION

FIELD OF THE INVENTION

The present invention relates to segmented polyurethane/ureas having good mechanical and thermal properties, to fibers made with such polyurethane/ureas and to processes for the production of such polyurethane/ureas and fibers. More particularly, the present invention pertains to polyurethane/ureas and spandex fibers made by chain extending an isocyanate-terminated prepolymer in the presence of a solvent. The isocyanate-terminated prepolymer is derived from an isocyanate-reactive component which includes a high molecular weight polytetramethylene ether glycol (PTMEG), a low molecular weight PTMEG and up to 30 equivalent %, based on total isocyanate-reactive component, of a low unsaturation, high molecular weight polyoxyalkylene diol.

BACKGROUND OF THE INVENTION

Polyurethane/ureas in the forms of fibers and films have found wide acceptance in the textile industry. The term "spandex", often used to describe these polyurethane ureas, refers to long chain synthetic polymers made up of at least 85% by weight of segmented polyurethane. The term "elastane" is also used (e.g., in Europe) to describe these polymers. Spandex is used for many different purposes in the textile industry, especially in underwear, form-persuasive garments, bathing wear, and elastic garments or stockings. The elastomeric fibers may be supplied as core spun elastomer yarns spun round with filaments or staple fiber yarns or as a staple fiber in admixture with non-elastic fibers for the purpose of improving the wearing qualities of fabrics which are not in themselves highly elastic.

In the past, thread made of natural rubber was the only material available to provide elasticity to fabrics. Spandex, originally developed in the 1950s, has numerous advantages over such rubber filaments. The most important of these is its higher modulus. Typically, for a given denier, spandex has at least twice the recovery, or retractive power, of rubber. This enables stretch garments to be manufactured with less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents (for example, those used in dry cleaning), and a high resistance to oxidation and ozone as well. Furthermore, in contrast to rubber filaments, spandex fibers can be dyed relatively easily with certain classes of dyestuffs.

Spandex made with PTMEG-derived prepolymers and polymers does not have the elongation or the low hysteresis of natural rubber but it is characterized by improved retractive power, higher tensile strength and the ability to better withstand oxidative aging. These improved features have made PTMEG-derived spandex the industry standard, despite the difficulties associated with PTMEG-derived prepolymers and polymers, and the relatively high cost of PTMEG itself.

Preparation of polyurethane elastomers by the polyaddition process from high molecular weight, substantially linear polyhydroxyl compounds, polyisocyanates and chain lengthening agents which have reactive hydrogen atoms by reaction in a highly polar organic solvent is known. The formation of fibers, filaments, threads, and films from these solvent-borne polyurethane elastomers and by reactive spinning is also known. See, e.g., U.S. Pat. Nos. 3,483,167 and 3,384,623 which disclose preparation of spandex fibers from isocyanate-terminated prepolymers prepared with polymeric diols.

For the reasons discussed above, the commercially preferred polymeric diol is polytetramethylene ether glycol (PTMEG). PTMEG is a solid at room temperature and produces prepolymers, particularly, diphenylmethane diisocyanate ("MDI") prepolymers having extremely high viscosities.

However, despite the inherent difficulties of handling PTMEG, its high cost and the unsatisfactory hysteresis of fibers made with PTMEG, PTMEG continues to be the mainstay of spandex production because, to date, no satisfactory substitute has been found.

One potential substitute for PTMEG which has been evaluated is polyoxypropylene glycol ("PPG") which, in principle, could be used to prepare spandex fibers. Preparation of spandex fibers from a prepolymer made with a polyol component composed primarily of PPG is attractive from an economic point of view because the cost of PPG is significantly lower than that of PTMEG. In addition, fiber prepared from prepolymers made with PPGs exhibit excellent elongation and retractive or holding power. PPGs are inherently easier to handle than PTMEG because they are non-crystallizable, relatively low viscosity liquids with low pour points. By contrast, PTMEGs are typically solids at 20 to 40° C. depending on the grade.

U.S. Pat. No. 3,180,854, for example, discloses a polyurethane/urea fiber based on a prepolymer made with a 2000 Da molecular weight polyoxypropylene glycol. However, the properties of polyoxypropylene-derived spandex fibers are generally inferior to those of fibers based on PTMEG. Consequently, polyoxypropylene glycols have not been utilized commercially in spandex production. See, e.g., the POLYURETHANE HANDBOOK (Gunther Oertel, Ed., Carl Hanser Verlag Pub., Munich 1985, p. 578) which states: "Polypropylene glycols have so far been used as soft segments only in experimental products since they produce inferior elastanes". (at page 578).

High molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during chain extension and yielding products which are generally inferior in comparison to PTMEG-derived elastomers.

The majority of polyoxyalkylene polyether polyols are polymerized in the presence of a pH-basic catalyst. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21.

Unsaturation is measured in accordance with ASTM D-2849-69 "Testing Urethane Foam Polyol Raw Materials," and expressed as milliequivalents of unsaturation per gram of polyol (meq/g).

Due to the continual formation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to approximately 1.6 to 1.7 from the nominal, or theoretical functionality of 2.0. In addition, the polyols have a high polydispersity, Mw/Mn due to the presence of the substantial amount of low molecular weight fractions.

Lowering unsaturation and the attendant large monol fraction in polyoxypropylene polyols has been touted as a means for production of polyurethane elastomers having improved properties. For example, use of polyols having a low content of monofunctional species has been suggested as a method for increasing polymer molecular weight; and increased polymer molecular weight has, in turn, been cited as desirable in producing higher performance polymers.

Reducing unsaturation in polyoxyalkylene polyols by lowering catalyst concentration and decreasing the reaction temperature is not feasible because even though low unsaturation polyols may be prepared, the reaction rate is so slow that oxypropylation takes days or even weeks. Thus, efforts have been made to discover catalysts capable of producing polyoxypropylated products in a reasonable amount of time without introducing monofunctionality due to allylic species.

In the early 1960's, double metal cyanide catalysts such as zinc hexacyano-cobaltate complexes were developed to accomplish this objective. Such complexes are disclosed in U.S. Pat. Nos. 3,427,256; 3,427,334; 3,427,335; 3,829,505; and 3,941,849. Although the unsaturation level is lowered to approximately 0.018 meq/g, the cost of these catalysts coupled with the need for lengthy and expensive catalyst removal steps prevented commercialization of processes for the production polyoxyalkylene polyols using these catalysts.

Other alternatives to basic catalysts such as cesium hydroxide and rubidium hydroxide are disclosed in U.S. Pat. No. 3,393,243. Barium and strontium oxide and hydroxide catalysts (disclosed in U.S. Pat. Nos. 5,010,187 and 5,114,619) enabled modest improvements with respect to unsaturation levels. However, catalyst expense, and in some cases, toxicity, and the modest level of improvement attributable to these catalysts, mitigated against their commercialization. Catalysts such as calcium naphthenate and combinations of calcium naphthenate with tertiary amines have proven to be useful in preparing polyols with unsaturation levels as low as 0.016 meq/g, and more generally in the range of from 0.02 to 0.04 meq/g. (See, e.g., U.S. Pat. Nos. 4,282,387; 4,687,851; and 5,010,117.)

In the 1980's, double metal cyanide complex (DMC) catalysts were revisited. Improvements in catalytic activity and catalyst removal methods encouraged commercial use of DMC catalyzed polyols having low unsaturation levels (in the range of from 0.015 to 0.018 meq/g) commercially for a brief time. However, base catalysis continued to be the primary method used to produce polyoxypropylene polyols. pH-basic catalysts continue to be the catalysts which are primarily used in commercial polyoxyalkylene polyol production processes.

Major advances in DMC catalysts and polyoxyalkylation processes have enabled preparation of ultra-low unsaturation polyoxypropylene polyols on a commercial scale. High molecular weight polyols (molecular weight in the 4000 Da to 8000 Da range) typically exhibit unsaturation levels in the range of from 0.004 to 0.007 meq/g when catalyzed by these improved DMC catalysts. At these levels of unsaturation, only 2 mol percent or less of monofunctional species is present. GPC analysis of these polyols shows them to be virtually monodisperse, often exhibiting polydispersities of less than 1.10. Several such polyols have recently been commercialized as ACCLAIM™ polyols.

U.S. Pat. No. 5,340,902 discloses that unsaturation levels of less than 0.03 milliequivalents/g are beneficial in the production of spandex fibers but does not provide any examples which illustrate use of polyols having unsaturation levels of less than 0.03 meq/g in the production of spandex fibers. U.S. Pat. No. 5,691,441 discloses that blends of low monol polyols with unsaturation levels of less than 0.010 meq/g are needed to achieve the benefits of the disclosed invention.

U.S. Pat. No. 5,691,441 also teaches that "The ultra-low unsaturation polyols have been found to be quantitatively different than both conventional polyols and low unsaturation polyols". In view of this teaching, it would be expected that the properties of spandex made with blends of PTMEG and polyoxypropylene diols having relatively high levels of unsaturation (greater than 0.010 meq/g) would have properties which are markedly inferior to those of fibers based on blends of PTMEG and polyoxypropylene diols having ultra-low levels of unsaturation (i.e., less than 0.010 meq/g). U.S. Pat. No. 5,691,441 further teaches that the polyoxypropylene diols containing ultra-low levels of unsaturation should be used in quantities of from 5 to 50 equivalent percent of the total polyol component.

SUMMARY OF THE INVENTION

It is an object of the present invention to provide polyurethane/ureas useful for the production of spandex fibers which are made from an isocyanate-terminated prepolymer prepared with an isocyanate-reactive component, generally a polyol component, in which up to 30 equivalent percent of the isocyanate-reactive component is a polyoxyalkylene diol having low unsaturation levels but which produce spandex fibers having physical properties comparable to those of spandex fibers made with 100% PTMEG.

It is another object of the present invention to provide a process for the production of polyurethane/ureas and spandex fibers made from such polyurethane/ureas in which the advantageous physical properties of fiber made with PTMEG are achieved.

It is a further object of the present invention to provide polyurethane/ureas and spandex fibers made from such polyurethane/ureas which are based in part on less expensive and easier to handle polyoxypropylene glycols and which exhibit improved properties.

It is also an object of the present invention to provide spandex fibers and a process for making spandex fibers characterized by good tenacity, elongation, retractive power, set, modulus and thermal properties.

These and other objects which will be apparent to those skilled in the art are achieved by chain extending in the presence of a solvent an isocyanate-terminated prepolymer which has been produced from an isocyanate-reactive component which includes: (1) at least one high molecular weight (i.e., molecular weight greater than or equal to 1000 Da) PTMEG, (2) at least one low molecular weight (i.e., molecular weight less than 1000 Da) PTMEG and (3) up to 30 equivalent percent of at least one polyoxyalkylene diol, preferably a polyoxypropylene glycol, having a molecular weight greater than about 1500 Da and an unsaturation level less than or equal to 0.03 meq/g. The polyurethane/urea thus obtained may then be spun into fiber.

DESCRIPTION OF THE PREFERRED EMBODIMENTS OF THE INVENTION

The present invention is directed to polyurethane/ureas suitable for use in the production of spandex fibers, to spandex fibers produced from these polyurethane/ureas and to processes for the production of such polyurethane/ureas and spandex fibers.

The polyurethane/ureas of the present invention are prepared from isocyanate-terminated prepolymers. Suitable prepolymers are produced by reacting an isocyanate-reactive component which is generally composed of diols with an excess of a diisocyanate. The isocyanate-terminated prepolymers typically used to produce this type of polyurethane/urea generally have a relatively low isocyanate content. Isocyanate contents of from about 1 to about 3.75% are preferred. Particularly preferred prepolymers have isocyanate contents of from 2–3.5%. The prepolymer is chain extended in solution.

A key feature of the present invention is the polyol-containing isocyanate-reactive component used to prepare the isocyanate-terminated prepolymers. This isocyanate-reactive component includes: (1) up to 30 equivalent % of at least one high molecular weight, low unsaturation polyoxyalkylene polyol; (2) at least one high molecular weight PTMEG; and (3) at least one low molecular weight PTMEG.

The unsaturation level of the high molecular weight polyoxyalkylene polyol, preferably a polyoxypropylene polyol employed in the present invention must be less than or equal to 0.03 meq/g. The isocyanate-reactive component used to produce the isocyanate-terminated prepolymer should include the high molecular weight polyoxyalkylene polyol in an amount no greater than 30 equivalent percent (based on the total weight of the isocyanate-reactive component), preferably from about 5 to about 25 equivalent %, more preferably, from about 5 to about 20 equivalent %. The high molecular weight polyoxyalkylene polyol present in the isocyanate-reactive component has an unsaturation level less than or equal to 0.03 meq/g, preferably, less than 0.02 meq/g, more preferably less than 0.015 meq/g, and most preferably less than or equal to 0.010 meq/g. However, it is within the scope of the present invention to include a minor portion of high molecular weight polyoxyalkylene polyol which has a somewhat higher unsaturation level. In such cases, the actual unsaturation of the high molecular weight polyoxy-alkylene polyol should still be about 0.03 meq/g or lower.

As used herein, the term "low unsaturation polyoxypropylene polyol (or glycol)" means a polyol prepared by oxypropylating a dihydric initiator with propylene oxide in the presence of a catalyst in a manner such that the total unsaturation of the polyol product is less than or equal to 0.03 meq/g.

The polyoxypropylene polyol may contain oxyethylene moieties distributed randomly or in block fashion. If the oxyethylene moieties are contained in a block, the block is preferably a terminal block. However, randomly distributed oxyethylene moieties are preferred when such moieties are present. In general, the polyoxypropylene glycol should contain no more than about 30 wt. % of oxyethylene moieties, preferably no more than about 20 wt. %, and more preferably no more than about 10 wt. %. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such glycols containing a major portion of oxypropylene moieties are considered polyoxypropylene polyols as that term is used herein.

The high molecular weight, low unsaturation polyoxypropylene polyols useful in the practice of the present invention will generally have a molecular weight of at least about 1500 Da, preferably at least about 2000 Da, and may range up to 20,000 Da or higher. It is particularly preferred that the molecular weight be in the range of from about 3000 Da to about 8,000 Da, and most preferably be in the range of from about 4000 Da to about 8000 Da.

Processes for making such polyols are known to those skilled in the art. Further, such polyols are commercially available.

"Molecular weight(s)" and "equivalent weight(s)" as used herein are expressed in Da (Daltons) and are the number average molecular weight(s) and number average equivalent weight(s), respectively, unless specified otherwise. The number average molecular weight for each polyether glycol is determined from the hydroxyl number of the polyether polyol as measured by the imidazole-pyridine catalyst method described by S. L. Wellon et al., "Determination of Hydroxyl Content of Polyurethane Polyols and Other Alcohols", ANALYTICAL CHEMISTRY, Vol. 52, NO. 8, pp. 1374–1376 (July 1980).

It is, of course, possible to use a blend of more than one high molecular weight polyoxypropylene polyol, or to add low molecular weight diols in a minor (i.e., less than 10 wt. %) quantity. It is also possible to use mixtures of polyoxypropylene diols having varying unsaturation levels in the practice of the present invention provided that the unsaturation level does not exceed about 0.03 meq/g.

However, when such blends are used, the average molecular weight of the blend of high molecular weight components should be at least 1500 Da and the average unsaturation level should still be no greater than 0.03 meq/g.

Preferably, the prepolymers are prepared from substantially all difunctional polyols, particularly those which are polyoxypropylene glycol-derived. The term "polyoxypropylene glycol" as used herein includes a minor amount, i.e., up to about 5 weight percent or more of a triol.

The high molecular weight polytetramethylene ether glycol (PTMEG) used to make the polyurethane/ureas of the present invention has a molecular weight greater than or equal to 1000 Da, preferably from about 1000 to about 6,000 Da, most preferably from about 2000 to about 3,000 Da.

The low molecular weight polytetramethylene ether glycol used to make the polyurethane/ureas of the present invention has a molecular weight of less than 1000 Da, preferably from about 200 to about 750 Da, most preferably from about 200 to about 500 Da.

The PTMEGs may be prepared by any of the known methods. One suitable method is the polymerization of tetrahydrofuran in the presence of a Lewis acid catalyst. Suitable polymerization catalysts include anhydrous aluminum chloride and boron trifluoride etherate. Such catalysts are well known and are the subject of numerous patents and publications. PTMEG polyols are commercially available in a variety of molecular weights from numerous sources. For example, DuPont sells PTMEG polyols under the trademark Terathane®. BASF Corporation sells PTMEG polyols under the designation PolyTHF. Penn Specialty Chemicals, Inc. sells such polyols under the trademark POLYMEG®.

The relative amounts of high and low molecular weight PTMEG will vary depending upon the specific prepolymer and fiber characteristics being sought. When larger amounts of high molecular weight PTMEG are used, the isocyanate-terminated prepolymer will have a higher viscosity and the fibers will have greater elongation values. When relatively large amounts of the low molecular weight PTMEG are used, fibers having higher retractive power and modulus values are obtained. A good balance between viscosity of the isocyanate-terminated prepolymer and the physical properties of fibers made with such prepolymer is achieved when the total PTMEG component is used in an amount of from about 65 to 95 equivalent percent, preferably from about 75 to about 95 equivalent percent, based on total amount of isocyanate-reactive material. The amount of high molecular weight PTMEG present in the PTMEG component will generally be from about 25 to about 65 equivalent %, preferably from about 35 to about 65 equivalent %, most preferably from about 45 to about 65 equivalent %. The amount of low molecular weight PTMEG present in the PTMEG component will generally be from about 20 to about 60 equivalent %, preferably from about 20 to about 50 equivalent %, most preferably from about 20 to about 40 equivalent %, based on total equivalents of PTMEG. The amount of high molecular weight PTMEG and low molecular weight PTMEG should, however, total 100 equivalent percent of PTMEG. The optimum amounts of high molecular weight PTMEG and low molecular weight PTMEG for achieving specific viscosity and fiber physical properties may be readily determined by techniques known to those in the art.

The isocyanate-reactive component used to produce the prepolymer from which the spandex fibers of the present invention are produced is predominantly a diol component. However, the isocyanate-reactive component may also include a minor amount (i.e., up to 10 wt. %) of other polyol(s) (i.e., polyol(s) which are not a PTMEG or a low unsaturation polyoxypropylene diol having a molecular weight greater than 1500 Da) or other material(s) having at least one isocyanate-reactive group.

Any of the known aliphatic and/or aromatic diisocyanates may be used to produce the isocyanate-terminated prepolymers employed in the present invention. Preferred isocyanates include: linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 4,4'-methylene diphenylene diisocyanate (4,4'-MDI), tetramethylxylylene diisocyanate, and the like. 4,4'-MDI is particularly preferred.

The isocyanate-reactive component is reacted with an excess of the desired diisocyanate, preferably under an inert atmosphere or under vacuum at slightly elevated temperature, i.e., between 50° C. and 100° C., more preferably between 60° C. and 90° C. The amount of excess isocyanate is selected so as to provide a % NCO group content in the prepolymer of between about 1.0 weight percent and 3.75 weight percent, preferably between about 2 and 3.5 weight percent. The reaction of the isocyanate with the polyol-containing isocyanate-reactive component may be catalyzed with any of the catalysts known to promote the reaction of isocyanate and hydroxyl groups but the reaction may also take place without the use of a catalyst.

In one embodiment of the present invention, a catalyst which is a metal salt or soap of a $C_6$–$C_{20}$ monocarboxylic acid or naphthenic acid is used. Zinc octoate is particularly preferred.

In another embodiment of the invention, the prepolymer-forming reaction is carried out in the presence of at least 5%, preferably, at least 10% dimethylacetamide. The presence of this amount of dimethyl-acetamide makes it possible to produce the prepolymer at temperatures in the range of from 50 to 60° C. in relatively short periods of time without the use of a catalyst.

In general, the reaction of the isocyanate-reactive and isocyanate components proceeds until the point at which the isocyanate content becomes constant.

The isocyanate-terminated prepolymer is then generally dissolved in a solvent, preferably, a polar aprotic solvent such as dimethyl acetamide, dimethyl formamide, dimethyl sulfoxide, N-methylpyrrolidone, or the like, and then chain-extended with any of the known chain extenders. Aliphatic diamines such as ethylene diamine are among the most preferred chain extenders.

The term "polar aprotic solvent" as used herein means a solvent having the capability to dissolve the chain extended polyurethane at the desired concentration while being essentially non-reactive to isocyanate groups.

In a preferred embodiment of the present invention, a chain extender component which includes at least one asymmetric aliphatic and/or cycloaliphatic diamine and at least one linear diamine is used to chain extend the isocyanate-terminated prepolymer. The aliphatic and/or cycloaliphatic diamine is preferably present in an amount of from about 7 to about 25 equivalent percent, based on total equivalents of chain extender component, more preferably from about 7 to about 20 equivalent percent, most preferably, from about 10 to about 15 equivalent percent. The remainder of the chain extender component is linear diamine.

Examples of suitable asymmetric aliphatic and/or cycloaliphatic chain extenders include: 1,2 diaminopropane; isophorone diamine; methyl-1,3-diaminocyclo-hexane; 1,3-diaminocyclohexane; 2-methylpentamethylenediamine (commercially available from DuPont under the name Dytek A); 1,4-diamino-2-methylpiperazine; 1,4-diamino-2,5-dimethylpiperazine; and methyl bis-propylamine.

Examples of suitable linear amine chain extenders include: ethylene diamine; hydrazine; 1,3-propylene diamine; and tetramethylene diamine. Ethylene diamine is most preferred.

The polyurethane/urea thus obtained has both hard and soft segments. The terms "soft segment" and "hard segment" refer to specific portions of the polymer chains. The soft segments are the polyether-based portions of the segmented polyurethane/urea polymer, derived from the PTMEG and the polyoxyalkylene polyol. The hard segments are those portions of the polymer chains that are derived from the diisocyanate and chain extender. The term "NCO content" refers to the isocyanate group content of the prepolymer, before chain extension.

A chain terminator is generally included in the reaction mixture to adjust the final molecular weight, and thus the intrinsic viscosity, of the polyurethane/urea polymer to the desired value. Usually, the chain terminator is a monofunctional compound such as a secondary amine (e.g., diethylamine or dibutylamine).

Any of the processes for producing spandex polymers known to those skilled in the art may be used to produce the polyurethane/urea elastomers and spandex fibers of the present invention. Such processes are disclosed, for example, in U.S. Pat. Nos. 3,384,623; 3,483,167; and 5,340,902, which are herein incorporated by reference.

Having generally described this invention, a further understanding can be obtained by reference to certain specific examples which are provided herein for purposes of illustration only and are not intended to be limiting unless otherwise specified.

EXAMPLES

Measuring Methods

The properties of the spandex materials produced in the Examples were determined as follows:

(1) The intrinsic viscosities $\eta$ of the elastomers were measured in dilute solution having a concentration c of 0.5 g/100 ml dimethyl acetamide at 30° C. by determination of the relative viscosity $\eta_r$ against the pure solvent and were converted in accordance with the following equation:

$$\eta_r = t_1/t_0$$

where:
$t_1$ is the throughflow time (sec) of the polymer solution
$t_0$ is the throughflow time (sec) of the pure solvent $$\eta = (Ln\ \eta_r)/c$$

(2) Tenacity and elongation were determined in accordance with DIN 53 815 (cN/dtex).

(3) The set or residual elongation was determined after 5×300% elongation with a recovery period of 60 seconds in between. Set is a measure of the fiber's ability to be stretched and then return to its original length. Any excess length is measured as percent set or residual elongation, and low values are desirable. Typical percent sets of PTMEG-derived spandex fibers are less than 30 percent, preferably less than 25 percent.

(4) The heat distortion temperature (HDT), hot tear time (HTT) and fall in tension in hot water (FTHW) are measured by the methods described in Chemiefasern/Texti-industrie, January 1978, No, 1/78, Vol. 28/80, pages 44–49. Relevant particulars can also be found in DE-OS 2 542 500 (1975) and U.S. Pat. No. 5,061,426.

The materials used in the Examples were as follows:

POLYOL A: A propylene oxide-based diol having a number average molecular weight of 8,000 Da and an unsaturation level of 0.005 meq/g.
POLYOL B: Polytetramethylene ether glycol having a number average molecular weight of 2,000 Da.
POLYOL C: A polytetramethylene ether glycol having a number average molecular weight of 250 Da.

-continued

POLYOL D: A poloxypropylene diol having a molecular weight of 4000 Da and an unsaturation level of 0.005 meq/g.
POLYOL E: A polytetramethylene ether glycol having a number average molecular weight of 1000 Da.
MDI: 4,4'-diphenylmethane diisocyanate.
ZNO: Zinc octoate (8% zinc octoate in dimethylacetamide).
DMAc: Dimethylacetamide.
EDA: Ethylene diamine.
IPDA: Isophorone diamine.
DEA: Diethylamine.

Example 1

1340 gm of POLYOL A, 987 gm of POLYOL B and 139.2 gm of POLYOL C were combined and dehydrated in a vacuum for 1 hour at 120° C. After cooling to room temperature, 50 ppm of ZNO were mixed into the polyol blend. 508.7 g of MDI were added at 55° C. The reaction mixture was heated for 110 minutes at 80° C. until the prepolymer had an NCO content of 2.04%.

At 60° C., 1275.6 gm of DMAc were added to the prepolymer and the mixture was cooled to 25° C. The homogenized mixture of prepolymer and DMAc had an NCO content of 1.40%. 14.96 gm of EDA, 7.80 gm IPDA, 1.56 gm DEA and 2331 gm DMAc were added to 1706 gm of the diluted prepolymer with rapid mixing. After one hour of mixing, the resulting solution had a viscosity of 61 Pa.s. An additional 64 gm of the diluted prepolymer were added and allowed to mix for 30 minutes. At this point the solution had a viscosity of 72 Pa.s.

0.3% by weight Mg stearate, 2.0% by weight Cyanox® 1790 anti-oxidant (commercially available from Cyanamid), 0.5% by weight Tinuvin® 622 stabilizer (commercially available from Ciba-Geigy), and 0.3% by weight of the polyether siloxane Silwet® L7607 (a product of Union Carbide Corp., USA) were added to the viscous polymer solutions (quantities based on polyurethane solids). This resulted in a final solution having the viscosity, solids content and intrinsic viscosity reported in TABLE 1. The solutions were then dry spun to form 40 denier fibers.

The relative amounts of materials used and the properties of the polymer solution and of the fibers made with the solution are reported in TABLE 1.

Examples 2–3

The procedure used in Example 1 was repeated using the materials listed in TABLE 1 in the relative amounts indicated in TABLE 1. The properties of each of the polymer solutions and of the fibers made with these solutions are reported in TABLE 1.

TABLE 1

| Example | 1 | 2 | 3* |
|---|---|---|---|
| Equivalent %, POLYOL A | 13.56 | 13.56 | 0 |
| Weight %, POLYOL A | 54.33 | 54.33 | 0 |
| Equivalent %, POLYOL B | 40.16 | 40.16 | 100 |
| Weight %, POLYOL B | 40.02 | 40.02 | 100 |
| Weight %, POLYOL C | 5.64 | 5.64 | 0 |
| Equivalent %, POLYOL C | 46.28 | 46.28 | 0 |
| Molecular Weight of Blend | 2000 | 2000 | 2000 |
| NCO:OH | 1.65 | 1.65 | 1.65 |
| Prepolymer Viscosity, Pa·s | 30.8 | 30.8 | 51 |
| Prepolymer Catalyst | 50 ppm ZNO | 50 ppm ZNO | NONE |
| EDA, mole % | 96.0 | 81.5 | 95 |

TABLE 1-continued

| Example | 1 | 2 | 3* |
|---|---|---|---|
| IPDA, mole % | 0 | 15 | 0 |
| DEA, mole % | 4 | 3.5 | 5 |
| POLYMER SOLUTION | | | |
| % Solids | 30 | 30 | 30 |
| Viscosity @ 50° C., Pa·s | 58 | 69 | 59 |
| Intrinsic Viscosity, dL/g | 1.373 | 1.379 | 1.269 |
| Spinning Speed (m/min.) | 420 | 420 | 420 |
| FIBER PROPERTIES | | | |
| Tenacity (cN/dtex) | 1.22 | 1.36 | 1.52 |
| Actual Tenacity (cN/dtex)[1] | 9.00 | 9.34 | 10.79 |
| % Elongation | 635 | 594 | 608 |
| 400% Modulus, cN/dtex | 0.226 | 0.302 | 0.326 |
| 5th Cycle Unload Power @ 150%, cN/dtex | 0.018 | 0.026 | 0.021 |
| Set, % | 16 | 12 | 15 |
| THERMAL PROPERTIES OF FIBER | | | |
| Heat Distortion Temp. (° C.) | 165 | 162 | 167 |
| Hot Tear Time (sec) | 11.6 | 8.1 | 10.2 |
| FTHW, % | 29 | 30 | 28 |

[1]Actual Tenacity =Tenacity based on actual denier at break.
*Comparative Example As can be seen from the data presented in TABLE 1, the prepolymers produced in accordance with the present invention (Examples 1 and 2) had substantially lower viscosities than the prepolymer prepared with only the high molecular weight PTMEG. The fibers produced from the polyol blends required in the present invention (Examples 1 and 2) had excellent physical properties which in most cases were comparable to those made with high molecular weight PTMEG alone (comparative Example 3). In particular, the fibers of the present invention had lower modulus than those made with high molecular weight PTMEG alone.

Examples 4–5

The procedure of Example 1 was repeated using the materials listed in TABLE 2 in the relative amounts indicated in TABLE 2. The properties of the prepolymers and of the fibers produced from those prepolymers are also reported in TABLE 2.

TABLE 2

| EXAMPLE | 4 | 5 |
|---|---|---|
| Equivalent %, POLYOL D | 20.6 | 20.6 |
| Weight %, POLYOL D | 45.6 | 45.6 |
| Equivalent %, POLYOL B | 44.9 | 44.9 |
| Weight %, POLYOL B | 49.7 | 49.7 |
| Equivalent %, POLYOL C | 34.5 | 34.5 |
| Weight %, POLYOL C | 4.7 | 4.7 |
| Molecular Weight of Overall Blend (Da) | 1800 | 1800 |
| NCO:OH | 1.8 | 1.8 |
| Prepolymer Viscosity, Pa·s (50° C.) | 21.1 | 21.1 |
| Prepolymer Catalyst | 50 ppm ZNO | 50 ppm ZNO |
| EDA, mole % | 82.5 | 97.5 |
| IPDA, mole % | 15 | 0 |
| DEA, mole % | 2.5 | 2.5 |
| Spinning Speed (m/min.) | 420 | 420 |
| Nominal Denier | 40 | 40 |
| Modulus @ 100%, cN/dtex | 0.062 | 0.063 |
| Modulus @ 200%, cN/dtex | 0.115 | 0.106 |
| Modulus @ 300%, cN/dtex | 0.179 | 0.149 |

TABLE 2-continued

| EXAMPLE | 4 | 5 |
|---|---|---|
| Modulus @ 400%, cN/dtex | 0.314 | 0.222 |
| Tenacity, cN/dtex | 1.44 | 1.05 |
| Actual Tenacity[1], cN/dtex | 9.61 | 7.47 |
| Elongation at Break, % | 568 | 610 |
| Set, % | 20 | 27 |
| 5th Cycle, Load Power @ 150%, cN/dtex | 0.024 | 0.023 |
| Heat Distortion Temp. (° C.) | 161 | 166 |
| Hot Tear Time (sec) | 10.7 | 12.2 |

[1]Actual Tenacity = Tenacity based on actual denier at break.

As can be seen from the data presented in TABLE 2, the fibers produced in accordance with the present invention were characterized by excellent physical properties.

Examples 6–9

The procedure of Example 1 was repeated using the materials listed in TABLE 3 in the relative amounts indicated in TABLE 3. The properties of each of the polymer solutions and of the fibers made with these solutions are reported in TABLE 3.

TABLE 3

| Example | 6 | 7* | 8* | 9* |
|---|---|---|---|---|
| Equivalent % POLYOL D | 20.6 | 40.3 | 65.0 | 26.9 |
| Weight % POLYOL D | 45.6 | 91.7 | 78.8 | 59.4 |
| Equivalent % POLYOL B | 44.9 | — | 35.0 | — |
| Weight % POLYOL B | 49.7 | — | 21.2 | — |
| Equivalent % POLYOL E | — | — | — | 73.1 |
| Weight % POLYOL E | — | — | — | 40.6 |
| Equivalent % POLYOL C | 34.5 | 59.7 | — | — |
| Weight % POLYOL C | 4.7 | 8.3 | — | — |
| Overall POLYOL Blend Molecular Weight | 1800 | 1750 | 3300 | 1800 |
| NCO:OH | 1.8 | 1.7 | 1.8 | 1.8 |
| Prepolymer Catalyst | 50 ppm ZNO | 50 ppm ZNO | 50 ppm ZNO | 50 ppm ZNO |
| Amines: | | | | |
| EDA, mole % | 82.5 | 83.5 | 83.0 | 83.5 |
| IPDA, mole % | 15 | 15 | 15 | 15 |
| DEA, mole % | 2.5 | 1.5 | 2.0 | 1.5 |
| Polymer Solution: | | | | |
| % Solids | 30 | 35 | 30 | 30 |
| Polymer Solution Viscosity @ 50° C., Pa·s | 57 | 57 | 122 | 64 |
| Intrinsic viscosity, dL/g | 1.325 | 1.01 | 1.26 | 1.21 |
| Spinning Speed (m/min.) | 420 | 420 | 420 | 420 |
| Fiber properties: | | | | |
| Tenacity (cN/dtex) | 1.44 | 1.05 | 0.96 | 1.21 |
| Actual Tenacity[1] (cN/dtex) | 9.61 | 7.48 | 7.97 | 8.10 |
| % Elongation | 568 | 611 | 727 | 569 |
| 100% Modulus, cN/dtex | 0.062 | 0.066 | 0.041 | 0.066 |
| 300% Modulus, cN/dtex | 0.179 | 0.179 | 0.127 | 0.175 |
| 5th Cycle Unload Power @ 150%, cN/dtex | 0.024 | 0.020 | 0.022 | 0.021 |
| Set, % | 20 | 23 | 11 | 26 |
| Thermal Properties of Fiber: | | | | |
| Heat Distortion Temp (° C.) | 161 | 155 | 156 | 162 |
| Hot Tear Time (sec) | 10.7 | 3.8 | 6.3 | 7.6 |

*Comparative Example
[1]Actual Tenacity = Tenacity based on actual denier at break In comparative Example 7 it is demonstrated that use of a prepolymer produced with only a high molecular weight, low unsaturation polyoxypropylene diol and a low molecular weight PTMEG (i.e., no high molecular weight PTMEG) produced fibers which had lower tenacity, set and thermal properties than fibers made in accordance with the present invention (Example 6).

In comparative Example 8 it is demonstrated that use of a prepolymer produced with only a high molecular weight, low unsaturation polyoxypropylene diol and a high molecular weight PTMEG (2000 Da) (i.e., no low molecular weight PTMEG) produced fibers which had significantly lower tenacity than fibers made in accordance with the present invention (Example 6). The thermal properties (HDT and HTT) of the fibers of comparative Example 8 were also inferior to those of the fibers made in Example 6.

In comparative Example 9 it is demonstrated that use of a prepolymer produced with only a high molecular weight, low unsaturation polyoxypropylene and a high molecular weight PTMEG (1000 Da) (i.e., no low molecular weight PTMEG) produced fibers which exhibited set values 30% higher than those of fibers made in accordance with the present invention (Example 6). The tenacity of the fibers produced in comparative Example 9 was also lower than that of the fibers made in Example 6.

Having now fully described the invention, it will be apparent to one of ordinary skill in the art that many changes and modifications can be made thereto without departing from the spirit or scope of the invention as set forth herein.

What is claimed is:

1. A segmented polyurethane/urea produced by reacting in solution:
   a) an isocyanate-terminated prepolymer having a free isocyanate group content of from about 1.0 to about 3.75% which is the reaction product of
      (1) a stoichiometric excess of at least one diisocyanate with
      (2) an isocyanate-reactive component comprising:
         (i) a diol component which comprises
            (a) from about 5 to about 30 equivalent percent of at least one polyoxypropylene diol having a molecular weight of at least 1500 Da and an average unsaturation level less than or equal to about 0.03 meq/g,
            (b) from about 20 to about 60 equivalent percent of at least one polytetramethylene ether glycol having a molecular weight of less than 1000 Da and,
            (c) from about 25 to about 65 equivalent percent of at least one polytetramethylene ether glycol having a molecular weight greater than or equal to 1000 Da and optionally,
         (ii) one or more other materials containing at least one functional group that is reactive with an isocyanate group, provided that the sum of the equivalent weight percents of (i) and (ii) is 100 equivalent percent, with
   b) a chain extender in the presence of
   c) a solvent.

2. The polyurethane/urea of claim 1 in which the chain extender comprises at least one asymmetric aliphatic and/or cycloaliphatic diamine and at least one linear diamine.

3. The polyurethane/urea of claim 1 in which from about 5 to about 25 equivalent percent of the diol component is (a).

4. The polyurethane/urea of claim 1 in which diol (a) has an average molecular weight of from about 2000 to about 8000 Da.

5. The polyurethane/urea of claim 1 in which from about 20 to about 50 equivalent percent of the diol component is (b).

6. The polyurethane/urea of claim 1 in which from about 35 to about 65 equivalent percent of the diol component is (c).

7. The polyurethane/urea of claim 1 in which the diol component comprises from about 5 to about 20 equivalent percent (a), from about 20 to about 40 equivalent percent (b), and from about 45 to about 65 equivalent percent (c).

8. The polyurethane/urea of claim 1 in which the diisocyanate is diphenylmethane diisocyanate.

9. The polyurethane/urea of claim 1 in which a catalyst was present during production of the prepolymer.

10. A spandex fiber spun from the polyurethane/urea of claim 1.

11. A spandex fiber spun from the polyurethane/urea of claim 7.

12. A process for the production of spandex fiber comprising spinning a polyurethane/urea which is the reaction product of:
   a) an isocyanate-terminated prepolymer having a free isocyanate group content of from about 1.0 to about 3.75% which is the reaction product of
      (1) a stoichiometric excess of a diisocyanate with
      (2) an isocyanate-reactive component comprising
         (i) a diol component comprising
            (a) from about 5 to about 30 equivalent percent of at least one polyoxypropylene diol having a molecular weight in excess of about 1500 Da and an average unsaturation level less than or equal to about 0.03 meq/g,
            (b) from about 20 to about 60 equivalent percent of at least one polytetramethylene ether glycol having a molecular weight of less than 1000 Da; and
            (c) from about 25 to about 65 equivalent percent of at least one polytetramethylene ether glycol having a molecular weight greater than or equal to 1000 Da, and optionally,
         (ii) one or more other materials containing at least one functional group that is reactive with an isocyanate group, provided that the sum of the equivalent weight percents of (i) and (ii) is 100 equivalent percent, with
   b) a chain extender in
   c) a solvent.

13. The process of claim 12 in which the diisocyanate is diphenylmethane diisocyanate.

14. The process of claim 12 in which the chain extender comprises at least one asymmetric aliphatic and/or cycloaliphatic diamine and at least one linear diamine.

15. The process of claim 12 in which a catalyst is present during production of the prepolymer.

16. The process of claim 12 in which the prepolymer is formed in the presence of at least 5% dimethylacetamide.

17. The process of claim 12 in which the prepolymer is formed in the presence of at least 10% dimethylacetamide.

* * * * *